United States Patent [19]

Reynolds

[11] Patent Number: 4,850,490
[45] Date of Patent: Jul. 25, 1989

[54] SHOCK ISOLATION DEVICE

[75] Inventor: David F. Reynolds, Wrentham, Mass.

[73] Assignee: Barry Wright Corporation, Watertown, Mass.

[21] Appl. No.: 162,527

[22] Filed: Mar. 1, 1988

[51] Int. Cl.⁴ .................. B65D 81/06; B65D 81/10
[52] U.S. Cl. .................. 206/583; 206/320; 206/588; 206/594
[58] Field of Search ............... 206/319, 320, 521, 523, 206/583, 591, 592, 594, 588-590; 248/645, 669, 674-677; 267/140.5, 141, 153

[56] References Cited

U.S. PATENT DOCUMENTS

| | | | |
|---|---|---|---|
| 2,837,208 | 6/1958 | Lingenfelter | 206/583 |
| 3,003,656 | 10/1961 | Hardigg | 206/523 |
| 3,161,339 | 12/1964 | Weller | 206/521 |
| 3,185,415 | 5/1965 | Thorn | 248/645 |
| 3,236,513 | 2/1966 | Nicolaisen | 267/1 |
| 3,315,951 | 4/1967 | Boschi et al. | 267/141 |
| 3,401,791 | 9/1968 | Scott et al. | 206/523 |
| 3,482,895 | 12/1969 | Becklin | 206/594 |
| 3,635,332 | 1/1972 | Ross | 267/141 |
| 3,752,301 | 8/1973 | Bluemel | 206/583 |
| 4,469,303 | 9/1984 | Snyder | 248/634 |
| 4,574,955 | 3/1986 | Camossi | 206/583 |

Primary Examiner—Jimmy G. Foster
Attorney, Agent, or Firm—Schiller, Pandiscio & Kusmer

[57] ABSTRACT

A shock isolation device includes a center section and a pair of end sections which extend in opposite directions out from the center section. The device itself is made from a flexible, resilient material such that the center section may tightly engage an article to be supported without further attachement means. The center section may be rectangular whereas the end sections may each be generally triangular. At the apex or distal point of each triangle (furthest removed from the center section) fastening means may be used to attach the shock isolating device to a carrier.

11 Claims, 1 Drawing Sheet

SHOCK ISOLATION DEVICE

BACKGROUND OF THE INVENTION

This invention relates, in general, to shock isolation devices for isolating and protecting delicate electronic devices from vibration and shock. One example of such a shock sensitive device is a disk drive for a computer; which, if subjected to excessive shock, could be irreparably damaged. Such a device has been known to cost hundreds of dollars and therefore it is desirable that it be protected. It is of further concern, that damage to a disk drive could also result in the loss of data to a user who was unaware of the damage.

Thus manufacturers of computers have normally tried to isolate disk drives from shock to prevent such damage. Typically such isolators have consisted in several individual mounting devices each, of which, have to be applied between the device to be protected and the frame of the overall carrier. The individual application of numerous shock protective mountings to a single device to be protected is time consuming and not cost effective. Hence the need arises for an improved device for isolating a shock sensitive device from disturbances which may be incurred by the carrier.

U.S. Pat. No. 3,635,332 issued Jan. 18, 1972 is one example of a device for protecting a shock sensitive article. The device includes a plurality of suction mounts and bumper devices distributed around a container for the purpose of isolating a shock sensitive article. It is clear from the patent that assembly of such a device is labor intensive.

U.S. Pat. No. 4,469,303 issued Sept. 4, 1984 shows another example of a device for protecting a sensitive article from vibration. In that patent, hard brackets each having one side coupled to a support and a pair of surfaces attached to the shock sensitive article have the article engaging surfaces shock isolated from the support by means of elastomers located along the corners of the device.

U.S. Pat. No. 3,236,513 issued Feb. 22, 1966 shows a triangular shaped resilient support for protecting a shock sensitive article. A plurality of such supports are used to protect a single article.

While such prior art devices are satisfactory in the uses for which they were designed, there is still a great need to provide a shock isolating device for shock sensitive articles which combines a section for releasably holding the shock sensitive article with shock reducing mounting sections in a unitary supporting device.

It is therefore an object of the invention to provide a shock isolating device which may easily be attached to the shock sensitive article and which may also be easily mounted in the carrier.

More particularly, it is an object of the invention to provide a shock isolating device which may securely engage the shock sensitive article but is not attached thereto.

Further, it is an object of the invention to provide a shock isolating device which requires a minimum of attachment points to support a shock sensitive article.

These and other desirable objects of the invention will become apparent hereinafter after consideration of the specification and with reference to the accompanying drawing.

SUMMARY OF THE INVENTION

In accordance with the present invention, a shock isolating device is disclosed for supporting a shock sensitive article wherein the shock isolating device comprises a unitary support member formed of a flexible resilient elastomeric material having a center section adapted to releaseably retain a shock sensitive article and further including end sections integral with the center section for connecting the center section to the carrier and for also providing shock isolation. The end sections extend in opposite directions from the center section with the distal end of each end section provided with a mean for accommodating attachment to the carrier. In a preferred embodiment, each end section is generally triangular in form with the distal apex serving as the point of attachment to a carrier.

BRIEF DESCRIPTION OF THE DRAWINGS

For a more complete understanding of the nature and desired objects of the invention, reference should be had to the following detailed description taken in connection with the accompanying drawings wherein like reference characters denote corresponding parts throughout the drawings and wherein.

DETAILED DESCRIPTION OF THE INVENTION

Figure 1:
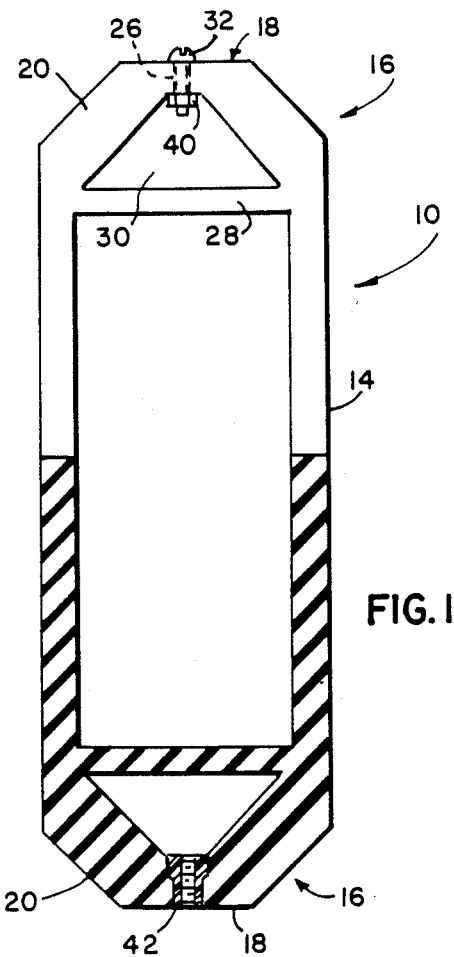
FIG. 1 is a partial elevation view of the shock isolation device and further includes a portion which is in cross-section.

Referring to the drawings, a shock isolating device 10 includes a center section 14 and a pair of end sections 16 which extend outwardly in opposite directions from each end of the center section. The shock isolating device is preferably made in one piece from a flexible resilient material such as synthetic or natural rubbers. Suitable synthetic elastomers include silicone, neoprene and butyl rubbers. The center or strap section 14 is used to releasably retain a shock sensitive article 34 which may; for example, be a computer disk drive. Releasably retaining means that requires no further fastener other than the strap or center section itself is necessary for retaining the strap and the article in assembly. In a sense, there is an interference fit between the strap and the article to be retained.

Each end or isolator section 16, is in the shape of a triangle or trapezoid having an apex section 18, a base leg 28 opposite the apex section and a pair of convergent-divergent legs 20 which convergent portions join at the apex 18 and which divergent portions are connected at the base of the triangle. From the drawing it is clear that the end or isolator section 16 may be viewed as a triangle or trapezoid depending upon the width of the apex section. The apex section 18 is distal or remote from the base of each triangular end section and the base is integral with the strap or center section. Each end section or isolator 16 is formed with a cutout portion or opening 30 which is also generally triangular in shape.

Figure 2:
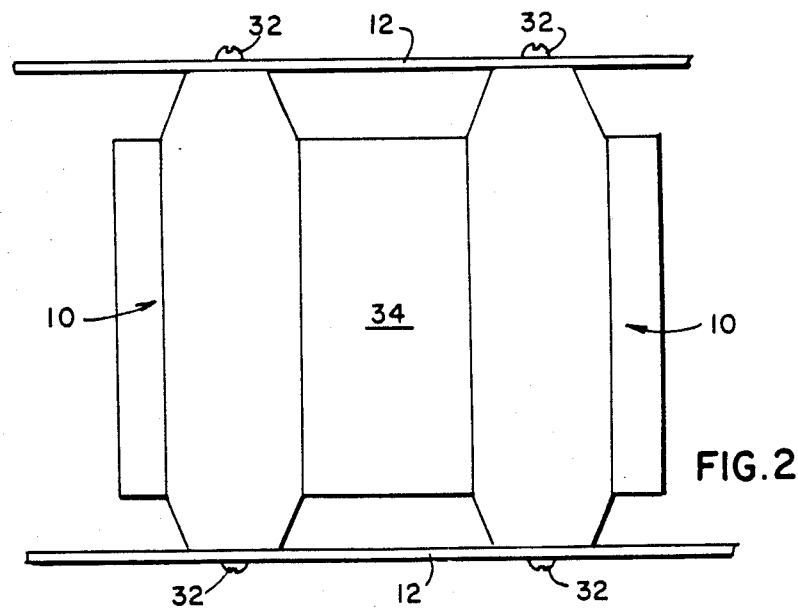
FIG. 2 is a side view of a plurality of devices according to the present invention installed in a carrier and having an article to be isolated shown therein.

Fastening means are also provided for the isolator or end section 20 whereby the shock isolating device may be mounted to a carrier 12. In one embodiment, fastening means includes a hole or bore 26 which is formed through the apex of the end section. Furthermore, a bolt 32 and a nut 40 may be used to attach the isolator to a carrier as shown in FIG. 2. Alternatively, in another embodiment, a threaded nut 42 may be mounted or molded into the apex of an end section whereupon during assembly of the shock isolating device to a carrier a male threaded member may be inserted into the nut 42. The nut may made from plastic. While the two different embodiments have been shown in FIG. 1, it is usual that one or the other of the same embodiment be consistently used for a particular isolator.

From FIG. 2, the advantages of the shock isolation device according to the present invention are clear. The article 34, to be protected, is inserted into the strap or center section 14 of the shock isolation device 10. The shock isolation device is comprised of a relatively flexible and resilient material which tightly engages the shock sensitive article thereby obviating any further means for retaining the article within the center section 14. Thereafter, attachment to a carrier or housing such as the interior of a computer central processing unit is made by fastening means at the apex of each end section. This arrangement provides a secure shock isolation mounting with a minimum of attachment points. The amount of shock isolation which is provided by the invention is a function of the elasticity of the material employed in forming the shock isolation device and the dimensions of each of the end sections which would be apparent to those having skill in the art.

While there is shown what is considered to be the preferred embodiment of the invention, other modifications may occur to those having ordinary skill in the art. It is intended to cover all such modifications as fall within the true spirit and scope of appended claims.

I claim:

1. A shock isolating device for supporting shock sensitive article within a carrier comprising:
    a hollow center section for releasably retaining the shock sensitive article to be supported and completely encompassing such article in a clasping relationship supporting said article in spaced relationship from said carrier; and
    a pair of hollow end sections formed integral with and extending in opposite directions from opposite ends of the center section, said end sections each having a distal portion that is spaced from said center section and is adapted for fastening the center section to the carrier;
    said center section and said end sections being made of an elastomeric material.

2. A device according to claim 1 wherein each end section includes means for fastening said distal portion of said end section to the carrier.

3. A device according to claim 1 wherein said center section and said end sections are formed of a single piece of molded elastomeric material.

4. A shock isolating device for supporting a shock article within a carrier comprising:
    a center section for releasably retaining the shock sensitive article to be supported; and
    a pair of end sections extending in opposite directions from the center section and integral therewith, said end sections each having a distal portion with respect to the center section for fastening the center section to the carrier, each end section being generally triangular in shape with a base leg and an apex portion, with said base leg being part of said center section and said apex portion comprising said distal portion.

5. A device according to claim 4 wherein each end section includes a cutout portion which is generally triangular in shape.

6. A device according to claim 4 wherein each end section includes a cutout portion which is generally trapezoidal in shape.

7. A shock isolating device for supporting a shock sensitive article within a carrier comprising:
    a center section for releasably retaining the shock sensitive article to be supported and completely encompassing such article in a clasping relationship supporting said article in spaced relationship from said carrier; and
    a pair of end sections extending in opposite directions from the center section and integral therewith, each end section having converging-diverging legs wherein the converging legs meet at a distal portion and the diverging legs are integral with the center section, and each end section contains means for fastening the end section to the carrier.

8. A device for supporting an article within a carrier comprising:
    a rectangular center section for releasably retaining the article to be supported; and
    a pair of generally triangular end sections extending in opposite directions from the center section and integral therewith, each end section having converging-diverging legs wherein the converging legs meet at a distal portion and the diverging legs are integral with the center section, each end section containing means for fastening the end section to the carrier.

9. A shock isolating device for supporting a shock sensitive article within a carrier comprising:
    a center section for releasably retaining the shock sensitive article to be supported and completely encompassing such article in a clasping relationship supporting said article in spaced relationship from said carrier; and
    a pair of end sections extending in opposite directions from the center section and integral therewith, said end sections each having a distal portion for fastening the center section to the carrier and a pair of converging-diverging legs that are integral with said center section and said distal portion, with said each pair of legs converging in the direction of said distal portion and diverging in the direction of said center section;
    said center section and said end sections being made of a flexible resilient material.

10. A shock isolating device for supporting a shock-sensitive article within a carrier comprising:
    a hollow center section made of a resilient elastomer for encompassing and releasably grasping and supporting the shock-sensitive article within but spaced from said carrier; and
    a pair of end sections formed integral with and extending in opposite directions from opposite ends of the center section, said end sections each having a distal portion and first and second mutually spaced leg portions that extend between and are formed integral with said center section and said distal portion, said distal portion having means for attaching said shock isolating device to said carrier, and said end sections also being made of a resilient elastomer.

11. A device according to claim 10 wherein each pair of legs is arranged so that said first leg portion and said second leg portion converge toward one another with increasing distance from said center section, and further wherein each end section comprises a third leg portion that also forms part of said center section, said first, second and third leg portions defining an open space.

* * * * *

UNITED STATES PATENT AND TRADEMARK OFFICE
CERTIFICATE OF CORRECTION

PATENT NO. : 4850490
DATED : July 25, 1989
INVENTOR(S) : David F. Reynolds

It is certified that error appears in the above-identified patent and that said Letters Patent is hereby corrected as shown below:

Claim 1, column 3, line 34, the word "a" should be inserted before the word "shock" (second occurrence).

Signed and Sealed this

Twenty-second Day of May, 1990

Attest:

HARRY F. MANBECK, JR.

*Attesting Officer*  *Commissioner of Patents and Trademarks*